United States Patent [19]

Manz et al.

[11] 4,159,848
[45] Jul. 3, 1979

[54] LINEAR LOCKING SEAT BELT RETRACTOR

[75] Inventors: David F. Manz, Bloomfield Hills; Clarence C. Irwin; Theodore M. Salamon, both of Sterling Heights, all of Mich.

[73] Assignee: General Motors Corporation, Detroit, Mich.

[21] Appl. No.: 914,394

[22] Filed: Jun. 12, 1978

[51] Int. Cl.² ................ A62B 35/00; B60R 21/10
[52] U.S. Cl. ................................... 297/474; 297/483
[58] Field of Search ............... 297/385, 388, 389, 386; 280/744, 747

[56] References Cited

U.S. PATENT DOCUMENTS

| | | | |
|---|---|---|---|
| 3,292,744 | 12/1966 | Replogle | 297/388 X |
| 3,419,308 | 12/1968 | Adri | 280/747 X |
| 3,439,932 | 4/1969 | Lewis et al. | 297/388 X |
| 3,526,431 | 9/1970 | Boedigheimer et al. | 297/388 |
| 3,535,001 | 10/1970 | Lewis et al. | 297/388 |
| 3,557,914 | 1/1971 | Tanaka | 297/386 X |
| 3,610,361 | 10/1971 | Pringle | 280/747 X |
| 3,645,549 | 2/1972 | Jantzen | 297/388 |
| 3,770,078 | 11/1973 | Keppel | 297/388 X |
| 3,869,173 | 3/1975 | Haller et al. | 297/388 |

FOREIGN PATENT DOCUMENTS 2305644  11/1973  Fed. Rep. of Germany ........... 297/388
2409159   9/1974  Fed. Rep. of Germany ........... 297/388

Primary Examiner—James T. McCall
Attorney, Agent, or Firm—Charles E. Leahy

[57] ABSTRACT

Mechanism for retracting a vehicle seat belt and locking the belt against extension includes a track mounted on the vehicle body and a belt carriage mounted on the track for movement in the belt extending and retracting directions. A locking pawl is mounted on the belt carriage and is selectively actuatable to a locked position engaging teeth on the track to lock the belt carriage against belt extending movement. A spring biases the carriage in the belt retracting direction. An actuating element extends alongside the track and is mounted for rotary movement into engagement with the locking pawl to move the locking pawl to the locked position. A pendulum supports the actuating element in a normal position and rotates the actuating element in response to a sensed condition of vehicle deceleration to actuate the locking means and thereby lock the carriage against belt extending movement along the track.

3 Claims, 5 Drawing Figures

LINEAR LOCKING SEAT BELT RETRACTOR

The invention relates to a seat belt retractor and more particularly to a seat belt retractor wherein a belt end is moved along a linear path by a track mounted carriage having associated locking means selectively actuatable to lock the carriage and thereby prevent belt extension.

BACKGROUND OF THE INVENTION

It is well known to mount the end of a seat belt on a vehicle body via a linear belt retracting mechanism including a carriage movable on a track. The carriage is typically moved in a belt retracting direction by a spring. A lock is provided to selectively prevent belt extension and is preferably a pawl or the like mounted on the carriage and selectively actuatable to engage the track. The lock is operated by a sensing means responsive to a condition of rapid belt unwinding or a condition of predetermined vehicle acceleration. The sensing means is preferably located at a fixed point on the vehicle body instead of on the moving carriage.

BRIEF SUMMARY OF THE INVENTION

The present invention provides a new and improved means for transmitting a locking signal from a vehicle deceleration sensing means located at a fixed location on the vehicle body to a belt carriage which is movable relative the vehicle body. More particularly, the invention provides a seat belt retracting and locking mechanism including a track mounted on the vehicle body and a belt carriage mounted on the track for movement therealong in the belt extending and retracting directions. The carriage is spring biased in the belt retracting direction. A locking pawl is mounted on the belt carriage and is actuatable to a locked position engaging teeth on the track to lock the belt carriage against belt extending movement. The locking pawl is spring biased to an unlocking position. An actuating element extends alongside the track and is mounted for rotary movement into engagement with the locking pawl to move the locking pawl to the locked position. A pendulum supports the actuating element in a normal position and rotates the actuating element in response to a sensed condition of vehicle deceleration to actuate the locking means and thereby lock the carriage against belt extending movement along the track.

One object, feature and advantage of the present invention resides in the provision of a linear locking retractor wherein a lock associated with a belt carriage movable along a track is mechanically linked to a suitable vehicle inertia sensor mounted at a fixed location on the vehicle body.

Another object, feature and advantage of the present invention resides in the provision of a linear locking retractor wherein an actuating element extends alongside a track and is movable by a deceleration sensing pendulum to engage a lock pawl mounted on the movable belt carriage and actuate the locking pawl into engagement with the track.

BRIEF SUMMARY OF THE DRAWINGS

These and other objects, features and advantages of the invention will become apparent upon consideration of the appended specification and the appended drawings in which:

Referring to FIG. 1, there is shown a vehicle body generally indicated at 10 having a conventional vehicle seat 12 mounted therein. The vehicle body 10 includes a door opening 14 which is selectively opened and closed by a door 16 having its forward end pivoted to the vehicle body for movement between the open position shown in FIG. 1 and a closed position.

Figure 1:
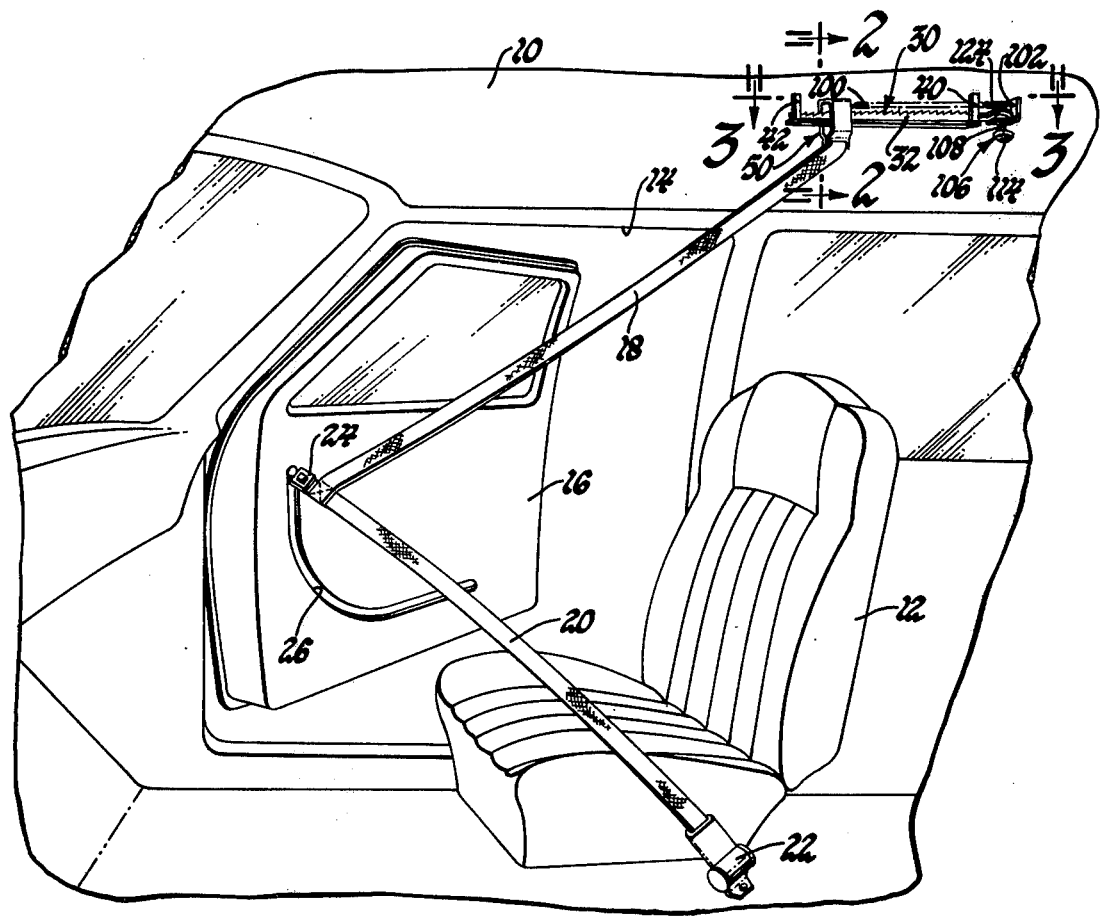
FIG. 1 is a perspective view of the vehicle body having a passive seat belt system employing a linear locking retractor according to the invention.

An occupant restraining belt system is provided in the vehicle body 10 to restrain an occupant in the vehicle seat 12. The restraint system includes a shoulder belt 18 and a lap belt 20. The inboard end of lap belt 20 is attached to the vehicle floor adjacent the inboard side of the seat by a conventional seat belt retractor 22. The retractor 22 has a reel which is spring biased to wind the lap belt 20 thereon and has an associated locking mechanism for selectively locking the reel against rotation in belt unwinding direction. The locking mechanism of the retractor 22 may be locked in response to deceleration of the vehicle or by rapid unwinding of the belt.

The outboard end of belt 20 is connected to an emergency release buckle 24 which is in turn attached to the door by a suitable mechanism which traverses a track 26 in the door panel to move the outboard end of the lap belt 20 between the FIG. 1 door-open position disposing the lap belt 20 forwardly of the occupant to facilitate ingress and egress and a rearward door-closed position in which the belt is positioned across the lap of the occupant. Reference may be had to U.S. Pat. No. 3,770,078, issued Nov. 6, 1973 to Keppel et al and assigned to the assignee of this invention for disclosure of a suitable mechanism for moving the buckle 24 and outboard lap belt end along the track 26.

The outboard end of shoulder belt 18 is sewn to the outboard end of lap belt 20 adjacent the emergency release buckle 24. The inboard end of shoulder belt 18 is attached to the vehicle roof at a location inboard and above the seated occupant by a linear locking retractor mechanism 30 of this invention.

Figure 2:
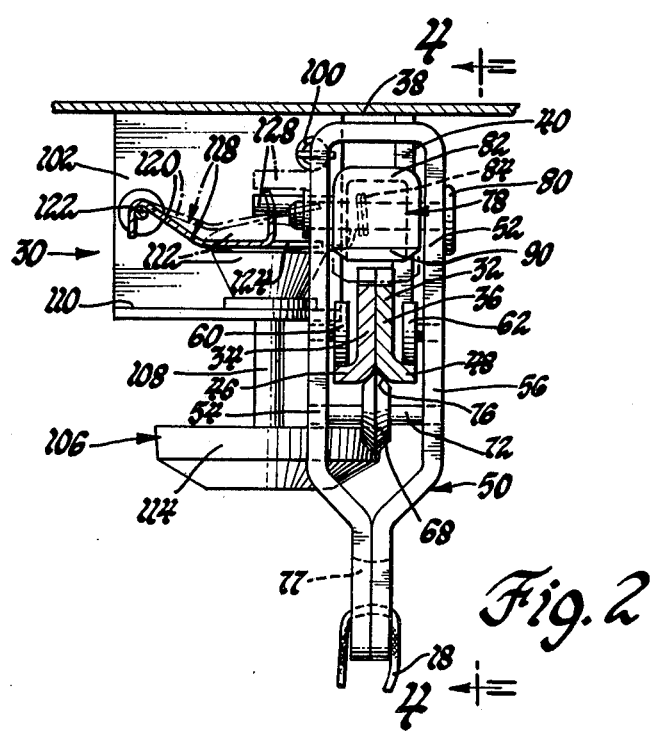
FIG. 2 is a sectional view taken in the direction of arrows 2—2 of FIG. 1.
Figure 3:
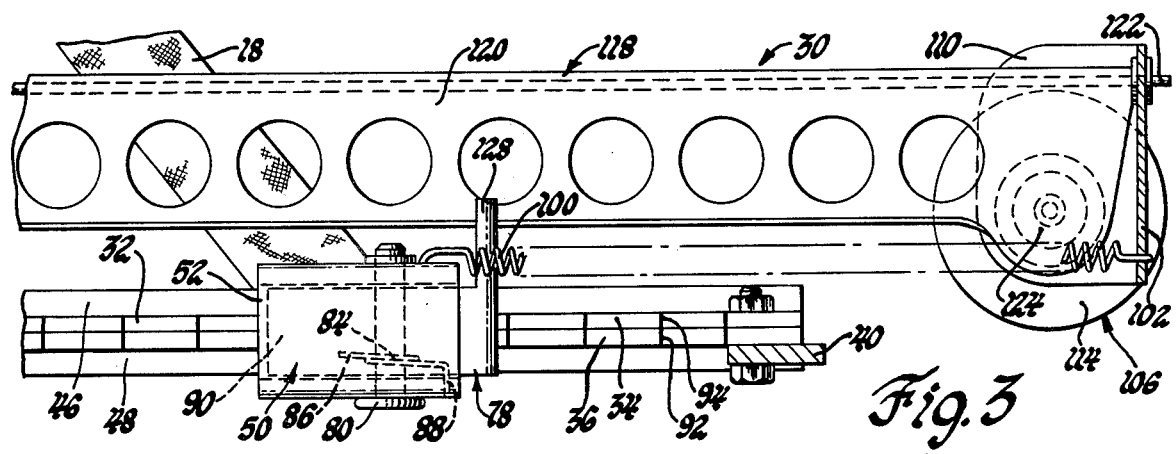
FIG. 3 is a view taken in the direction of arrows 3—3 of FIG. 1.

The linear locking retractor 30, FIGS. 2 and 3, includes a track 32 provided by a pair of L-shaped track members 34 and 36 bolted to one another and to the vehicle roof panel 38 by a rear bracket 40 and a front bracket 42. The track members 34 and 36 have respective flanges 46 and 48 which project outwardly from one another.

Figure 4:
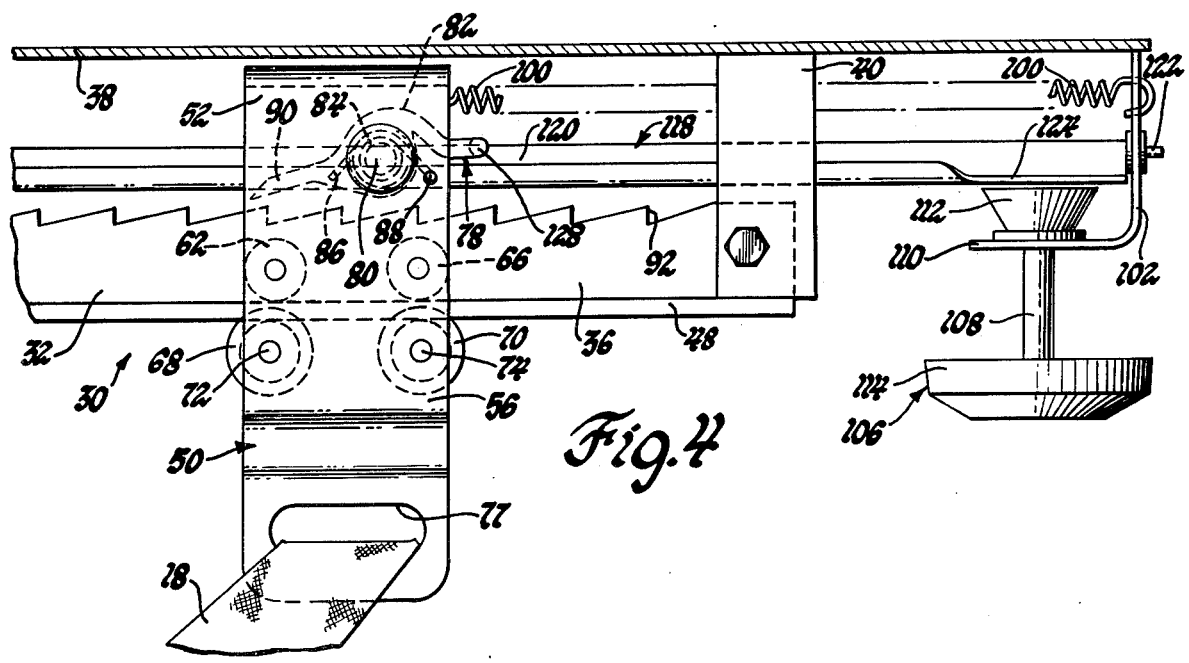
FIG. 4 is a side elevation view taken in the direction of arrows 4—4 of FIG. 2.
Figure 5:
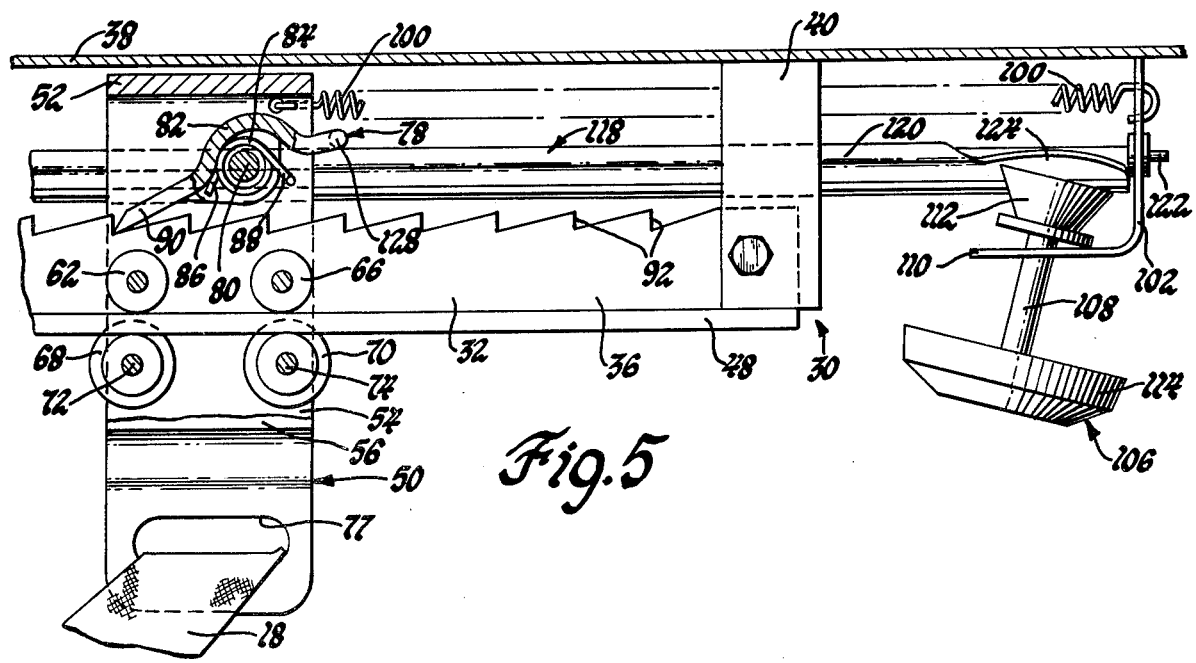
FIG. 5 is a view similar to FIG. 4 but showing the linear locking retractor in the locked position to prevent belt extension.

Referring again to FIGS. 2 and 3, it is seen that a belt carriage, generally indicated at 50, is mounted for movement along the track 32. The belt carriage 50 includes a carriage frame 52 having laterally spaced legs 54 and 56 which surround the track 32. A pair of rollers 60 and 62 are rotatably attached to the forward ends of frame legs 54 and 56 by a pair of axle shafts. A second pair of rollers, one of which is designated 66 in FIGS. 4 and 5, are provided at the rearward end of frame legs 54 and 56. These rollers bear upon the flanges 46 and 48 to support the carriage frame 52 for fore and aft movement along the track 32. A pair of rollers 68 and 70 are mounted on the carriage frame 52 by axle shafts 72 and 74 located beneath the track 32 and ride in a groove 76 at the juncture of the track members 34 and 36 to stabilize the carriage 50. The frame legs 54 and 56 define a slot 77 which receives the upper end of shoulder belt 18.

Referring again to FIGS. 2 and 3, it is seen that a locking mechanism indicated generally at 78 is provided on the carriage 50. The locking mechanism 78 includes pivot shaft 80 which extends between the frame legs 54 and 56 and pivotally mounts a pawl 82. A torsion spring 84 encircles the pivot shaft 80 and has a leg 86 engaging the pawl 82 and a leg 88 engaging the frame leg 54 to urge the pawl 82 to a normal position shown in FIGS. 2 and 4 wherein a pawl tooth 90 at the end of the pawl 82 is spaced away from engagement with a plurality of longitudinally spaced matching teeth 92 and 94 formed on the upper edges of the track members 34 and 36 of the track 32.

Referring to FIGS. 4 and 6, it is seen that the belt carriage 50 is urged in the rearwardly direction by a coil spring 100 which extends between the carriage 50 and a bracket 102 attached to the roof panel 38. The carriage could also be pulled rearwardly by a cable attached to the carriage and wound upon a spring biased reel as shown in U.S. Pat. No. 3,557,914, issued Jan. 26, 1971 to Tanaka and assigned to the assignee of this invention.

Referring to FIGS. 2 and 4, it is seen that a pendulum type inertia sensing device generally indicated at 106 is mounted on the bracket 102. The pendulum 106 includes a stem 108 which extends through an aperture of a lateral support portion 110 of the bracket 102 and has a cap 112 which rests upon the support portion 110. A weight 114 is attached to the lower end of the stem 108. A vehicle deceleration of predetermined magnitude causes the pendulum 106 to be displaced from its normal position of FIG. 2 to an actuated position of FIG. 5.

An actuating mechanism, generally indicated at 118, provides an operative connection between the pendulum 106 and the locking mechanism 78. Referring to FIGS. 2, 3 and 4, it is seen that the actuating mechanism 118 is comprised of a stamped sheet metal actuating plate 120 which is mounted for rotary movement about a longitudinally extending axis by a longitudinally extending pivot shaft 122 which has its rearward end journalled on the bracket 102 and its forward end, not shown, similarly journalled for rotary movement. As best seen in FIGS. 2 and 4, a depending portion 124 of the actuating plate 120 rests upon the cap 112 of the pendulum 106 to define a normal rotary position of the actuating plate 120. As seen in FIGS. 2 and 3, the pawl 82 has a laterally extending arm 128 which overlies the actuating plate 120 in vertically spaced relation therefrom. Referring to FIG. 5, it is seen that displacement of the pendulum 106 to its actuated position by a vehicle deceleration condition causes rotary motion of the actuating plate 120 into engagement with the laterally extending pawl arm 128 to pivot the pawl 82 against the bias of spring 84 into engagement with the teeth 92 and 94 of the track 32. The actuating plate 120 extends alongside the track 32 to transmit the locking signal to the pawl 82 irrespective of the position of the carriage along the track 32. The plate 120 may have a plurality of lightening holes which reduce the weight which must be lifted by the pendulum 106.

OPERATION

Referring again to FIG. 1, it will be understood that the opening movement of the door 16 moves the emergency release buckle 24 forward along the track 26 which in turn unwinds lap belt 20 from the retractor 22 and extends the shoulder belt 18 by forward movement of the carriage 50 along the track 32. Spring 84 maintains the pawl 82 away from engagement with the teeth 92 and 94 on track 32. When the door 16 is closed, the emergency release buckle 24 moves rearwardly along the track 26 permitting rearward movement of the shoulder belt carriage 50 by the spring 100.

When the vehicle experiences a rapid deceleration, the pendulum 106 is rocked from its normal position of FIG. 4 to the position of FIG. 5 wherein the actuating plate 120 is rotated to engage and pivot the pawl 82 into locking engagement with the teeth 92 and 94 on the track 32. Thus, the carriage is locked against forward belt extending movement.

An important feature of this invention is that the inertia sensing mechanism, whether a pendulum as shown, a ball or other prior known inertia sensing device, is fixed relative the vehicle body instead of being mounted on the belt carriage.

It will also be understood that the track 32 may have teeth along a portion of its length and no teeth along another portion to define locking and unlocking ranges of movement of the belt carriage 50. Furthermore, the actuating plate 120 may have a longitudinal extent which is less than the full length of travel of the carriage 50 along the track 32 to define locking and nonlocking ranges of movement of the belt carriage 50. Furthermore, it will be understood that the linear locking retractor of this invention may be oriented in any direction within the vehicle body as long as the inertia sensing pendulum is oriented in a manner which will assure its acceptable operation. Furthermore, although the linear locking retractor shown herein has the belt attached directly to the carriage 50, the belt may traverse one or more pulleys as shown in U.S. Pat. No. 3,557,914, issued Jan. 26, 1971 to Tanaka and assigned to the assignee of this invention. The use of one or more pulleys provides a retractor in which a considerable length of belt may be stored and is particularly desirable when the retractor of this invention is to be employed in the prior art active type belt systems where the purpose of the retractor is to store a considerable length of belt.

Thus, it is seen that the invention provides a new and improved linear locking seat belt retractor wherein an actuating element extends alongside a carriage track to convey a locking signal from the vehicle inertia sensing device to a locking pawl mounted on the carriage.

The embodiments of the invention in which an exclusive property or privilege is claimed are defined as follows:

1. A seat belt locking and retracting mechanism comprising:
   a longitudinally extending track member;
   a belt carriage member mounted on the track member for movement therealong and having a belt attached thereto;
   a locking means mounted on one of the members and actuatable to a locked position engaging the other member to lock the carriage member against movement along the track member;
   an actuating element extending longitudinally adjacent the track member along the path of carriage movement and being selectively movable relative thereto to actuate the locking means;
   and an inertia sensing means operatively engageable with the actuating element for moving the actuating element whereby the locking means is actuated by the actuating element in response to a sensed acceleration condition to lock the carriage member against movement along the track member.

2. A seat belt locking and retracting mechanism comprising:
- a longitudinally extending track having locking teeth spaced therealong;
- a belt carriage mounted on the track for longitudinal movement therealong and having the belt attached thereto;
- a locking pawl mounted on the belt carriage and adapted for actuation to a locked position engaging the teeth of the track to lock the carriage against movement along the track;
- a longitudinally extending actuating element mounted in parallel spaced relation with the track and adapted for movement relative the track;
- means acting between the locking pawl and the actuating element to actuate the locking pawl to the locked condition upon movement of the actuating element relative the track;
- and an inertia sensing means mounted at a fixed longitudinal position relative the track, said inertia sensing means being operatively associated with actuating element to impart movement to the actuating element in response to a sensed acceleration condition whereby the locking pawl is actuated by the actuating element to lock the carriage against movement along the track.

3. A seat belt locking and retracting mechanism comprising:
- a track having locking teeth spaced therealong;
- a belt carriage mounted on the track for movement therealong and having the belt attached thereto;
- spring means acting on the carriage and urging the carriage along the track in the belt retracting direction;
- a locking pawl pivotally mounted on the belt carriage and adapted for actuation to a locked position engaging the teeth of the track to lock the carriage against movement along the track in at least the belt extending direction;
- spring means associated with the locking pawl urging the locking pawl to a normal position disengaged from the teeth of the track to permit movement of the carriage in the belt extending and retracting directions;
- an actuating element mounted in spaced parallel relation from the track and adapted for a rotary movement about a longitudinally extending axis to engage and actuate the locking pawl to the locked position;
- and an inertia sensing means mounted at a fixed longitudinal position relative the track, said inertia sensing means supporting the actuating element in a normal position and adapted to impart rotary movement to the actuating element in response to a sensed acceleration condition whereby the locking pawl is actuated by the actuating element to lock the carriage against movement along the track.

* * * * *